United States Patent [19]
Bitsch et al.

[11] Patent Number: 5,915,988
[45] Date of Patent: Jun. 29, 1999

[54] CONTACT FOR ELECTRICAL MOTORS

[75] Inventors: Helmut Adam Bitsch; Hartmuth Georg Friedrich Ploesser, both of Lautertal, Germany

[73] Assignee: The Whitaker Corporation, Wilmington, Del.

[21] Appl. No.: 08/875,314

[22] PCT Filed: Mar. 4, 1996

[86] PCT No.: PCT/IB96/00161

§ 371 Date: Jul. 24, 1997

§ 102(e) Date: Jul. 24, 1997

[87] PCT Pub. No.: WO96/27925

PCT Pub. Date: Sep. 12, 1996

[30] Foreign Application Priority Data

Mar. 7, 1995 [GB] United Kingdom .................. 9504580
Aug. 16, 1995 [GB] United Kingdom .................. 9516765

[51] Int. Cl.$^6$ ........................................ H01R 4/24
[52] U.S. Cl. ............................ 439/398; 439/862; 310/71
[58] Field of Search .................... 439/97, 95; 310/71, 310/398

[56] References Cited

U.S. PATENT DOCUMENTS

| | | | |
|---|---|---|---|
| 3,979,615 | 9/1976 | Neff | 310/71 |
| 4,036,545 | 7/1977 | Mysiak et al. | 439/95 |
| 4,366,404 | 12/1982 | Ziegler | 310/239 |
| 4,557,544 | 12/1985 | Esser | 439/97 |

FOREIGN PATENT DOCUMENTS

| | | |
|---|---|---|
| 0 139 451-A1 | 5/1985 | European Pat. Off. . |
| 0 236 254-A2 | 9/1987 | European Pat. Off. . |
| 0 304 528-A2 | 3/1989 | European Pat. Off. . |
| 2 613 546 | 10/1988 | France . |

*Primary Examiner*—Neil Abrams
*Assistant Examiner*—J. F. Duverne
*Attorney, Agent, or Firm*—Driscoll A. Nina

[57] ABSTRACT

A contact for engaging a magnet wire in an insulation displacement manner having a magnet wire insulation displacement contact section for engaging the magnet wire, a conductor engaging portion for engaging an electrical conductor that is be interconnected with the magnet wire, and a body portion therebetween where the conductor engaging portion extends from the body portion as a spring member having a contact surface thereupon remote from the body for forming a wiping interconnection with the conductor.

8 Claims, 3 Drawing Sheets

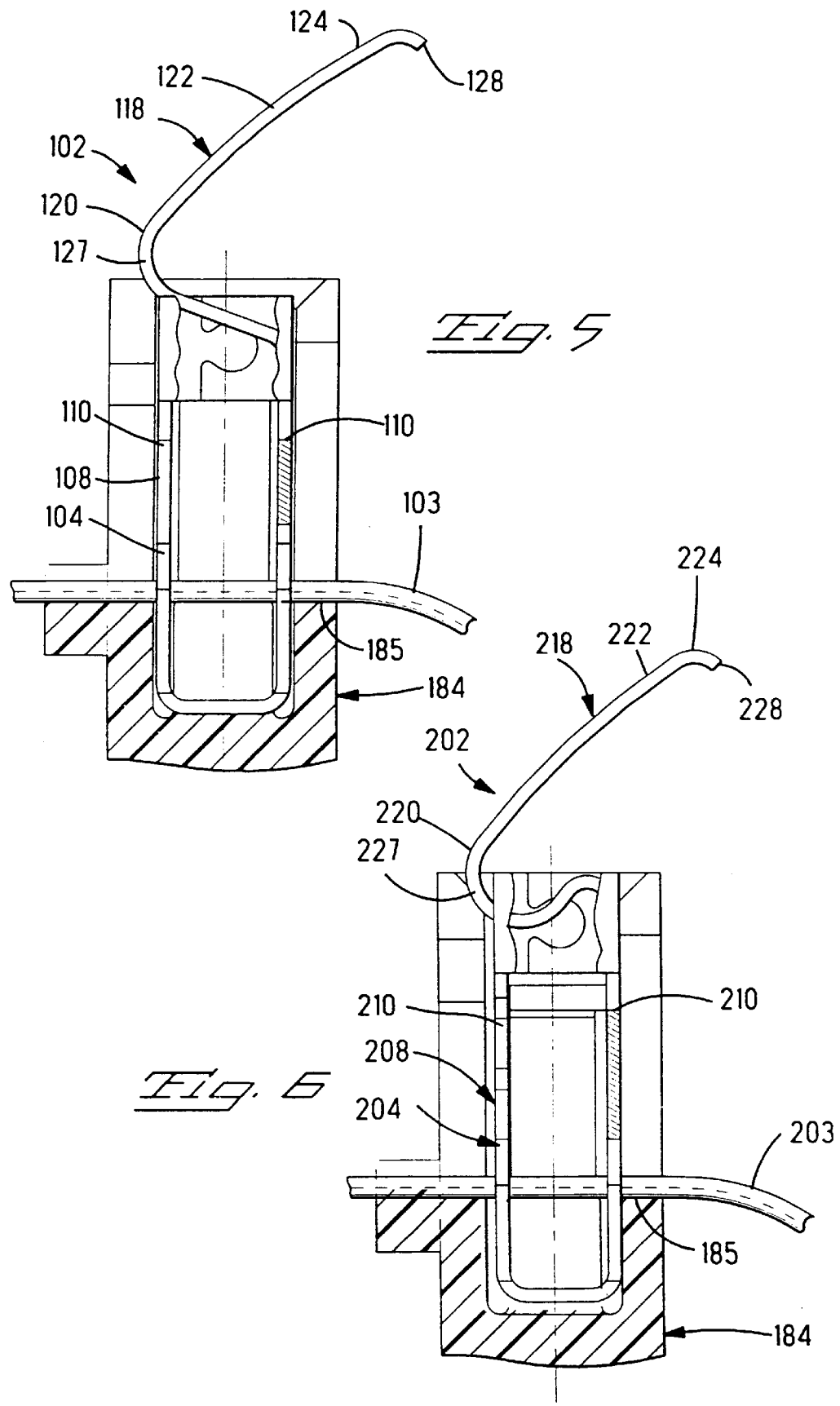

CONTACT FOR ELECTRICAL MOTORS

BACKGROUND OF THE INVENTION

1. Field of the Invention

This invention relates to electrical motors, their method of assembly, and contacts incorporated therein.

2. Summary of the Prior Art

As the number of electrical appliances increases, the need to manufacture and assemble small electrical motors in an efficient manner greatly increases. The motors are typically incorporated into appliances such as vacuum cleaners, kitchen appliances, and any other power accessory used in home or business. One electrical contact that is particularly useful for automated assembly is the Applicant's Mag-Mate Interconnection System. Contacts of this type enable insulation displacement-style contact techniques to be applied to magnet wire terminations, thereby eliminating the need for pre-stripping the magnet wire.

With particular respect to electrical motors, after winding the coils, the magnet wire is placed across a plastic cavity and retained therein by a slight frictional fit. The magnet wire is supported by part of the housing such that as the contact is inserted into the plastic cavity, the magnet wire is guided into the terminal slots of the contact. As the contact is seated, the film insulation upon the wire is striped and further insertion results in the bare wire coming in contact with contact surfaces within the slot. As the contact is being pressed within the cavity, locking barbs upon the contact bite into the plastic cavity assuring terminal retention.

In order to interconnect with a mating lead, various means for lead connection have been provided, such as poke-in latches for directly receiving the wire, tabs for receptacle terminals, posts for wrapping wire thereabout, wire barrels or solder tabs. Contacts of this type have preformed admirably and offer many advantages. However, as the industry becomes more and more sophisticated, it becomes necessary to provide electrical contacts that further enhance the assembly processes capability to be automated.

What is needed is an electrical contact incorporating the advantages outlined above, wherein the interconnection with the wire lead does not require a separate step. It would be advantageous if this interconnection could be formed in some sort of wiping manner. It would further be desirable to take advantage of this interconnection offered by the contact to provide an improved assembly technique that would enable further application of robotic assembly techniques to electrical motors. In particular, it would be desirable to enable the electrical brushes to be assembled with the motor unit in a first preassembled position where the motor shaft carrying the motor windings and the commutator thereupon may be inserted into the coil cavity by robotic techniques, afterwhich the brush assemblies could be displaced into their final position, such that the electrical connection between the lead and the magnet wire is established.

SUMMARY OF THE INVENTION

An aspect of the invention is accomplished by providing a contact for engaging a magnet wire in an insulation displacement manner comprising a magnet wire insulation displacement contact section for engaging the magnet wire, a conductor engaging portion for engaging an electrical conductor to be interconnected with the magnet wire, and a body portion therebetween characterized in that the conductor engaging portion extends from the body portion as a spring member having contact surfaces thereupon for forming a wiping interconnection with the conductor.

A second aspect of this invention is accomplished by providing a method of assembly of an electrical motor as described above wherein brush assemblies comprising a spring loaded brush seated within a brush carrier unit is inserted into the motor housing in a first pre-loaded position located such that the motor shaft with the windings and commutator thereupon by be inserted into the coil cavity afterwhich the brush assembly may be displaced to a second operating position where the brush will come into contact with the commutator and the spring member of the contact engages the brush carrier.

Advantageously then, an electrical contact especially suited for automated assembly is provided, where a wiping interconnection is formed with the mating conductor so that automated assembly may be effectuated. Another advantage is that the wiping interconnection enables a brush carrier unit to form the electrical interconnection between the conductive lead to the motor and the magnet wire of the coil when the carrier unit it set in an operative position, thereby providing automated assembly possibilities especially suited to robotic techniques. It is yet another advantage of this invention that the structures are simple and easy to manufacture.

BRIEF DESCRIPTION OF THE INVENTION

The invention will now be described by way of example with reference to the following drawings, wherein;

FIG. 5 is a side sectional view of an alternative embodiment of an electrical contact according to the present invention; and FIG. 6 is a side sectional view of another alternative embodiment of an electrical contact according to the present invention.

DETAILED DESCRIPTION OF THE PREFERRED EMBODIMENT

Figure 1:
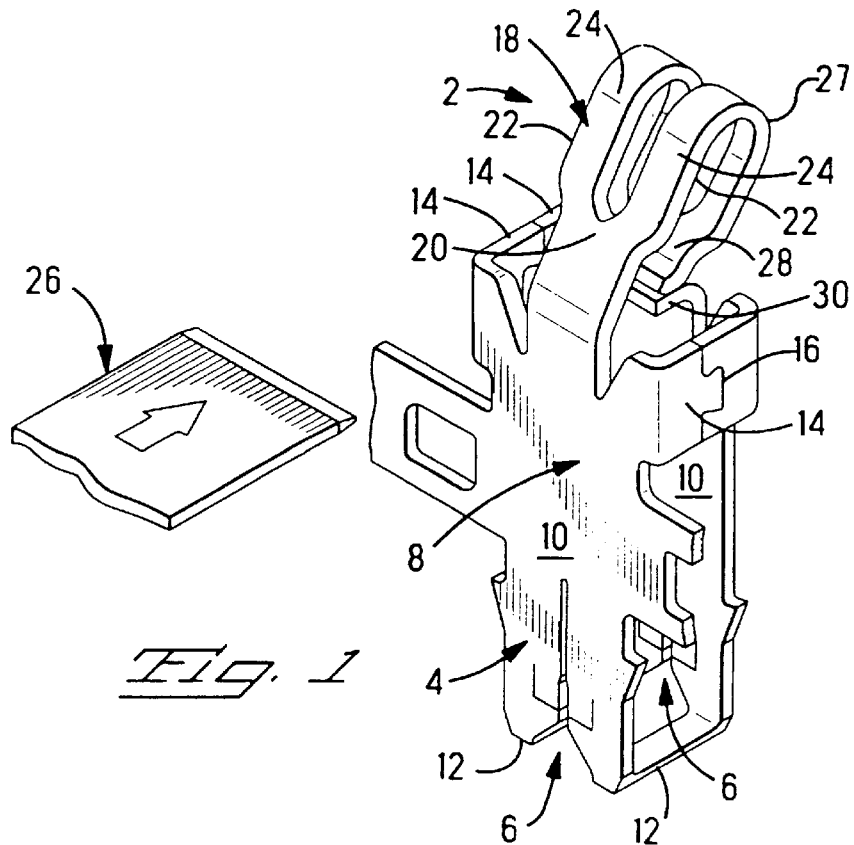
FIG. 1 is a perspective view of an electrical contact according to the present invention.

With reference first to FIG. 1, an electrical contact according to the present invention is shown generally at 2. The electrical contact 2 includes a magnet wire insulation displacement contact section 4 having in-line and spaced-apart wire receiving regions 6 for stripping the insulative film from the magnet wire and forming an electrical interconnection therewith. This structure being conventional in nature as was described above with reference to the Applicant's MAG-MATE electrical contact. The contact further includes a body section 8 from which the contact section 4 extends. The body section 8 and the contact section 4 comprise spaced-apart plates 10 joined together on opposite sides of the slots 6 by straps 12. Opposite the straps 12 are retention tabs 14 having complementary dove-tail structure 16 for holding the plates 10 together.

Extending from the body 8, opposite from the contact section 4, is a conductor engaging section 18. The conductor engaging section 18 includes a spring member 20 continuous with one of the plates 10, folded at an angle therefrom. The spring member 20 of the present embodiment is bifurcated to include a pair of contact members 22 having contact surfaces 24 thereupon for engaging a mating conductor 26 in a wiping manner when the conductor 26 is inserted. The spring member 20 extends beyond the other plate 10 where it is further folded back upon itself through an arc 27 so that the free end 28 overlies the opposite plate 10. The opposite plate 10 includes a tab 30 folded in an L-shaped manner therefrom towards the plate 10 from which the spring member 20 originates. The free end 28 rests upon the tab 30 in a supporting manner to provide stiffness and over-stress protection as the mating conductor 26 is engaged by the contact surfaces 24. In this embodiment the free end 28 and tab 30 are in abutting, but unjoined, contact; it may be desirable to provide a stiffer spring force by joining the free end 28 and tab 30 by welding, mechanical features, etc.

Figure 2:
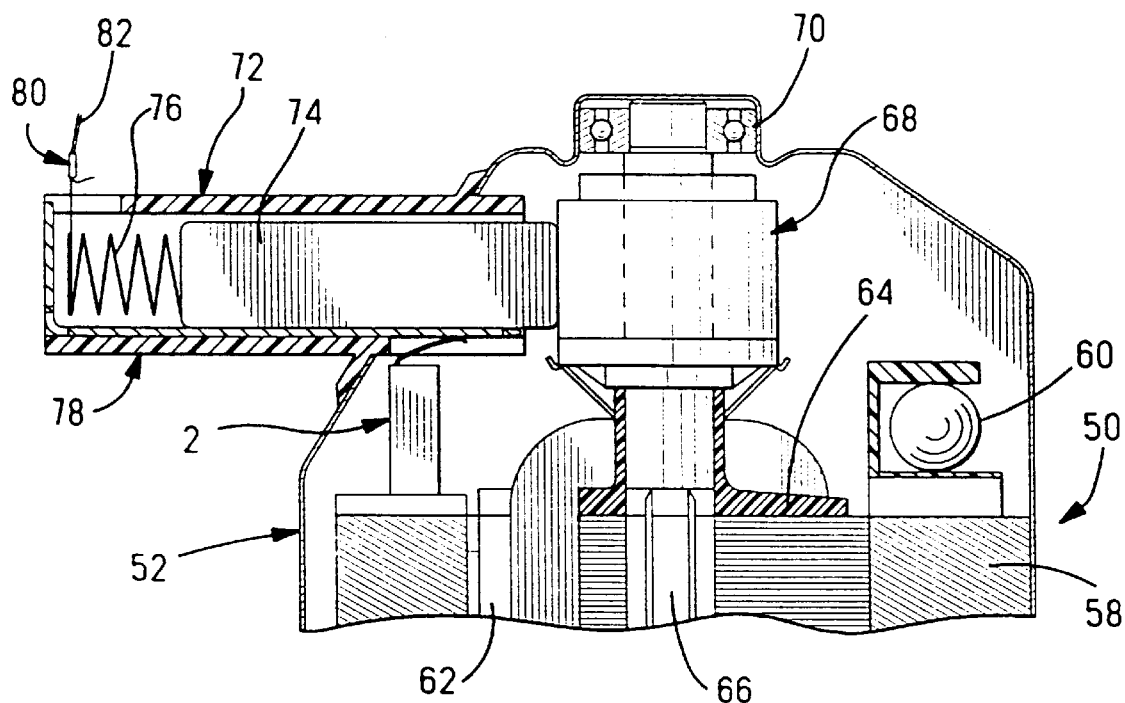
FIG. 2 is a side sectional view of a fully assembled electrical motor according to the present invention.

With reference now to FIG. 2, an electrical motor according to a second aspect of the present invention is shown generally at 50. The electrical motor 50 includes an outer housing 52 having a coil section 58 and a solenoid unit 60. Within the coil unit 58 is a coil cavity 62 wherein the motor windings 64 carried upon motor shaft 66 is disposed. Above the motor winding 64 on the motor shaft 66 is the commutator 68 and an upper bearing 70. Extending into the interior of the motor, transversely to the motor shaft 66 are brush assemblies 72. Each brush assembly includes a brush 74 resiliently biased by a spring 76 and being seated within a brush carrier 78. A tab type terminal assembly 80 connects a conductive lead 82 thereto. The electrical contact 2 described above is shown interconnecting the coil unit 58 to the brush assembly 72.

Figure 3:
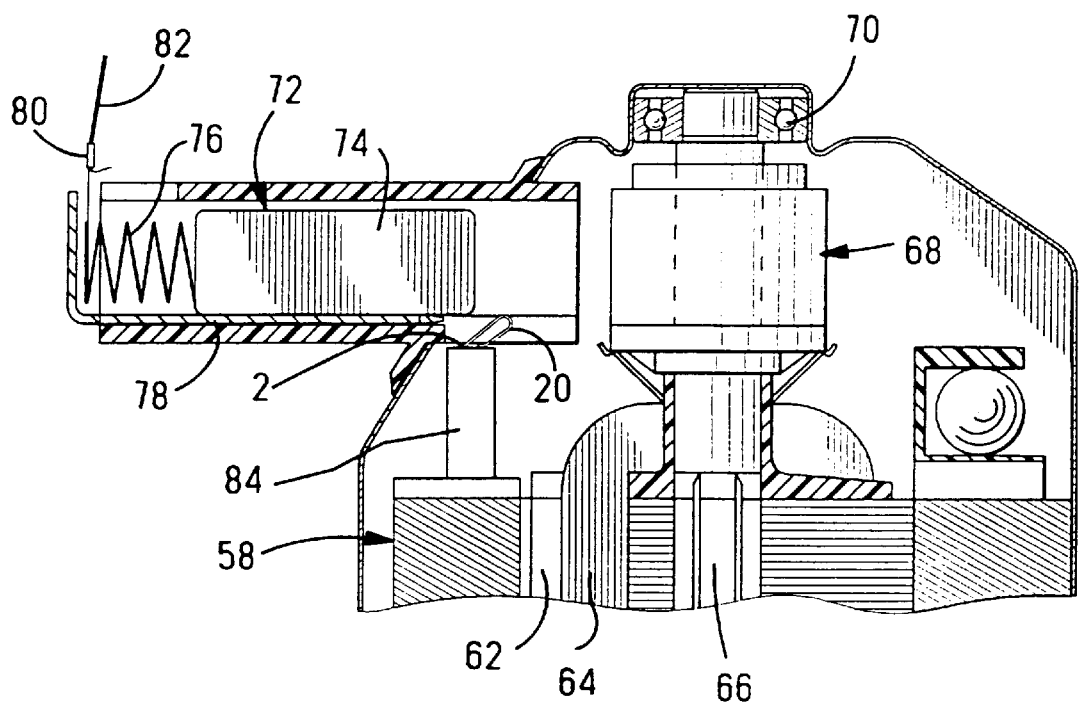
FIG. 3 is a partially cut-away side sectional view of the electrical motor of FIG. 2 showing a brush assembly in a pre-loaded position.

With reference now to FIG. 3, the motor assembly 50 is shown with brush assembly 74 in a first pre-loaded condition where it is clear of the commutator 68 and other associated structure on the motor 50. This first pre-loaded position, along with the loaded position described below, can be established by latches incorporated into the motor 50 and the brush assembly structure 72. The contact 2 is received within the cavity of a housing 84 such that the spring member 20 extends therefrom. With the brush assembly 72 loaded in this position, the motor shaft 66, with its associated components, could be inserted within the cavity 62 of the coil member 58.

Figure 4:
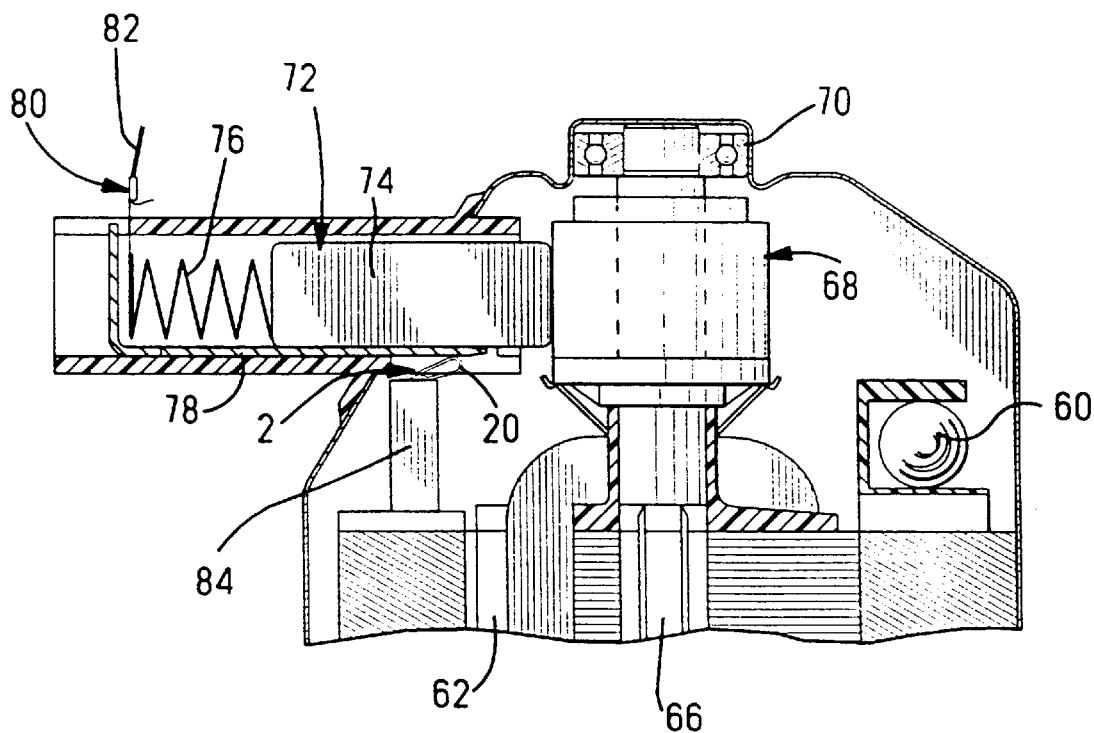
FIG. 4 is the side sectional view of FIG. 3 showing the brush assembly in the operative position.

With reference now to FIG. 4, the brush assembly 72 has been displaced to its loaded and operative position wherein the brush 74 is against the commutator 68. The brush carrier 78 has been biased forward towards the motor shaft 66 so that the carrier 78 comes in contact with the spring member 20 of the contact 2 forming an electrical interconnection with the conductive lead 82. The resiliency of the spring section 20 assures that the electrical interconnection with the carrier 78 is maintained.

With reference now to FIG. 5, an alternative embodiment of a contact according to the present invention is shown generally at 102. This contact 102 is basically as described above and is similarly numbered. The contact 102 includes a contact section 104 for engaging a magnet wire 103, where the contact section 104 extends from a body section 108 having two opposing plate sections 110. Extending from one of the plate sections 110 of the body 108 opposite the contact section 104 is a conductor engaging section 118. The conductor engaging section 118 is continuous from one of the plates 110 and folded at an angle towards the opposing plate 110. The conductor engaging section 118 includes a spring portion 120 that transitions to a contact member 122 having a contact surface 124 thereupon for engaging a mating conductor, such as 26, in a wiping manner when the conductor 26 is brought thereagainst. The conductor engaging section 118 has a free end 128 that is disposed above and beyond the contact body 108. The contact 102 is seated within a housing 184 that includes a ledge 185 for supporting the magnet wire 103 prior to insertion so that the contact section 104 may be reliably terminated therewith. In this embodiment, a softer spring is provided to the conductor engaging section 108; however, a greater resilient range is also accomplished.

With reference now to FIG. 6, a second alternative embodiment of a contact according to the present invention is shown generally at 202. The contact 202 is also as described above and similarly numbered. The contact 202 includes a contact section 204 for engaging the magnet wire 103 that is supported along the ledge 185 of a housing 184. The contact section 204 extends from a body section 208 along opposing plate portion 210. Extending from one of the plates 210 towards the opposite plate 210 is a conductor engaging section 218. In this embodiment, the conductor engaging section 218 includes spring member 220 that is initially folded inward between the two plate sections and then folded back over itself through approximately 180° in an arc 227 that acts as a spring for supporting a contact member 222 such that a contact surface 224 towards a free end 228 of the conductor engaging section 218 is disposed above the contact body 208 in a free hanging manner. It is important to note that in either of the embodiments of the contact, the conductor engaging section may be supported by the opposing plate 110,210 along the arc 127,227 if desired. The contact 202 of this embodiment also provides improved resiliency combined with greater elastic range.

Advantageously then, the electrical contact provides a wiping interconnection between a magnet wire and mating conductor by way of IDC engagement of the magnet wire and wiping engagement of the mating conductor, which greatly simplifies the assembly of an electrical motor. The electrical contact is simple to manufacture and incorporates the advantages of the pre-existing contact structure such that robotic assembly techniques may be utilized in the assembly of electrical motors.

We claim:

1. A contact for engaging a magnet wire in an insulation displacement manner comprising a magnet wire insulation displacement contact section for engaging the magnet wire, a conductor engaging portion for engaging an electrical conductor to be interconnected with the magnet wire, and a body portion therebetween characterized in that the conductor engaging portion is a resilient spring member that extends outward from the body portion and has contact surfaces remote from the body portion thereupon for forming a wiping interconnection by way of the resiliency of the spring arm with the conductor.

2. The contact of claim 1, further characterized in that the contact is formed of a pair of opposing plates joined together at the magnet wire insulation displacement contact section and the spring member has a free end that extends from one of the plates and is supported by the other plate.

3. The contact of claim 2, further characterized in that the spring arm extends from one of the plates at an angle thereto beyond the opposite plate and is then folded back through an arc.

4. The contact of claim 3, further characterized in that the opposite plate includes a tab and the free of the spring arm is disposed upon the tab in a supporting manner.

5. The contact of claim 4, further characterized in that the tab and the free end may slide relative to each other.

6. The contact of claim 1, further characterized in that the opposing plates are spaced apart from one another defining a space therebetween and the conductor engaging portion extending from one of the pair of plates of the body portion as a spring member is directed toward the opposing plate and then extends through an arc to a free end disposed above and away from the body portion.

7. The contact of claim 6, further characterized in that the spring member extends towards the opposing plate and outward from the space therebetween.

8. The contact of claim 6 further characterized in that the spring member extends towards the opposing plate and within the space therebetween enters the arc portion.

* * * * *